United States Patent
Dubber et al.

(10) Patent No.: US 11,923,792 B2
(45) Date of Patent: Mar. 5, 2024

(54) SOFTWARE BASED CONDITION MONITORING FOR MACHINES

(71) Applicant: Siemens Aktiengesellschaft, Munich (DE)

(72) Inventors: Daniel Dubber, Nuremberg (DE); Matthias Sandkaul, Neumarkt i.d. Opf. (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 18/021,136

(22) PCT Filed: Aug. 5, 2021

(86) PCT No.: PCT/EP2021/071905
§ 371 (c)(1),
(2) Date: Feb. 13, 2023

(87) PCT Pub. No.: WO2022/037961
PCT Pub. Date: Feb. 24, 2022

(65) Prior Publication Data
US 2023/0246581 A1 Aug. 3, 2023

(30) Foreign Application Priority Data
Aug. 19, 2020 (EP) .................... 20191726

(51) Int. Cl.
*H02P 23/14* (2006.01)
*G05B 19/4155* (2006.01)
*H02P 23/00* (2016.01)

(52) U.S. Cl.
CPC .......... *H02P 23/14* (2013.01); *G05B 19/4155* (2013.01); *H02P 23/0077* (2013.01); *G05B 2219/41329* (2013.01)

(58) Field of Classification Search
None
See application file for complete search history.

(56) References Cited

U.S. PATENT DOCUMENTS

| | | | |
|---|---|---|---|
| 6,262,550 B1 * | 7/2001 | Kliman | G05B 23/0264 318/565 |
| 6,847,854 B2 * | 1/2005 | Discenzo | G05B 13/024 700/36 |

(Continued)

FOREIGN PATENT DOCUMENTS

| | | | |
|---|---|---|---|
| JP | 6540911 B1 | 7/2019 | |
| WO | WO-2010103016 A1 * | 9/2010 | G06F 17/5009 |

(Continued)

OTHER PUBLICATIONS

PCT International Search Report and Written Opinion of International Searching Authority dated Nov. 26, 2021 corresponding to PCT International Application No. PCT/EP2021/071905 filed Aug. 5, 2021.

*Primary Examiner* — Mohammad Ali
*Assistant Examiner* — David Earl Ogg
(74) *Attorney, Agent, or Firm* — Henry M. Feiereisen LLC

(57) ABSTRACT

A computer-implemented method of predicting conditions of machines as well as a corresponding data processing system, computer program and computer-readable medium are disclosed. A technical specification of a machine is received. A data set including at least one current operational parameter of the machine is continuously received. A current load of the machine is continuously derived based on the provided technical specification and the received data set via a knowledge base. A current condition of the machine is continuously predicted by integrating over the derived current load and all previously derived current loads.

19 Claims, 5 Drawing Sheets

(56) References Cited

U.S. PATENT DOCUMENTS

| | | |
|---|---|---|
| 2008/0195365 A1 | 8/2008 | Ohkura et al. |
| 2014/0030089 A1 | 1/2014 | Wickstroem |
| 2015/0048157 A1* | 2/2015 | Juslin .................. G06F 9/44505 |
| | | 235/487 |
| 2017/0011298 A1 | 1/2017 | Pal et al. |
| 2018/0284741 A1* | 10/2018 | Cella ..................... G06Q 10/04 |
| 2019/0018403 A1 | 1/2019 | Ueki |
| 2020/0382036 A1 | 12/2020 | Shiiya et al. |
| 2022/0082090 A1 | 3/2022 | Kumar et al. |

FOREIGN PATENT DOCUMENTS

| | | | |
|---|---|---|---|
| WO | WO-2019163020 A1 * | 8/2019 | .............. F16C 19/06 |
| WO | WO 2020-142542 A1 | 7/2020 | |

* cited by examiner

SOFTWARE BASED CONDITION MONITORING FOR MACHINES

CROSS-REFERENCES TO RELATED APPLICATIONS

This application is the U.S. National Stage of International Application No, PCT/EP2021/071905, filed Aug. 5, 2021, which designated the United States and has been published as International Publication No. WO 2022/037961 A1 and which claims the priority of European Patent Application, Serial No. 20191726.7, filed Aug. 19, 2020, pursuant to 35 U.S.C. 119(a)-(d).

BACKGROUND OF THE INVENTION

The present invention is related to a computer-implemented method of predicting conditions of machines, in particular motors such as geared motors, as well as a corresponding data processing system, computer program and computer-readable medium.

Machines, in particular, drive systems and motor control units like frequency converters, electric motors and electric geared motors are usually designed on the basis of the required power, torque and load cycles. Thereby, static values are used which are assumed as a constant load on the machine. In reality, however, there are deviations in the actual power, torque and load cycles during operation. This has a considerable effect on the condition of the machine or rather its components during operation and their remaining service life.

Critical components of the geared motor are, for example, the bearings, oil, (mechanical) holding brakes and shaft sealing rings and other wear parts. Due to the prescribed maintenance intervals, an operator is required to carry out regular checks and replace worn parts. In particular, worn critical components. This requires a high expenditure of time and capacity, which contradicts the goat of high equipment availability and cost-effectiveness.

Further, due to the static design of machines it is highly probable that maintenance will not take place at the optimum time. This means that maintenance either takes place too early, because the actual load on the geared motor was lower than assumed at the design stage, resulting in unnecessary consumption of resources, or too late, because the actual load was higher which can lead to a failure of the machine decreasing system availability. Since it is often not possible for the operator to determine the optimum time for maintenance, a failure of the machine is accepted as a cheap option and attempts are made to restore plant availability by keeping massive resources available (personnel in shift work, material).

It is known to use condition monitoring systems (CMS) to minimize the risk of a failure or to increase the availability of machines with optimal maintenance intervals. CMSs record the actual load conditions using external sensors on the machines or drives. The external sensors cause additional investments and expenditure for installation and integration. They also create further sources of error.

Consequently, it is an object of the present invention to increase the associated service life of machines and predicting the optimal time point for maintenance/servicing in a cost-effective way by providing a computer-implemented method of predicting conditions of machines as well as a corresponding data processing system, computer program and computer-readable medium. Further refinements of the present invention are subject of the dependent claims.

SUMMARY OF THE INVENTION

According to a first aspect of the present invention a computer-implemented method of determining conditions of electric motors comprises the following steps:
Receiving a technical specification of a electric motor.
Continuously receiving a data set including at least one current operational parameter of the electric motor.
Continuously deriving a current load of the electric motor based on the provided technical specification and the received data set via a knowledge base), wherein the knowledge base comprises relationships between the provided technical specification together with the received data set and the current load of the electric motor.
Continuously determining a current condition of the electric motor by integrating over the derived current load and all previously derived current loads.

Within the scope of the present disclosure the term "continuously" will be understood as dynamically, i.e. not statically, preferably during the operation of the machine, e.g. of the electric motor.

According to a second aspect of the present invention a data processing system for determining conditions of electric motor comprises means for carrying out the steps of the method according to any preceding claim.

According to a third aspect of the present invention a computer program comprises instructions which, when the program is executed by a computer, cause the computer to carry out the steps of the method according to the first aspect of the present invention.

According to a fourth aspect of the present invention a computer-readable medium has stored thereon the computer program according to the third aspect of the present invention.

The electric motor may be part of an industrial system or plant and Jointly controlled with other machines by a controller like an industrial edge device, a programmable logic controller (PLC) or a cloud system (e.g. connected via a connector like an Internet of things (IoT) gateway to several machines (i.e. frequency controllers of the electric motors)).

The technical specification of the machine, e.g. of the electric motor gives structural information about the machine and may be known from design of the machine. The technical specification may comprise values of physical quantities and references describing the machine, like maximal torque, maximal rotational speed, gear ratio, number and type of motor bearings, number and type of gear bearings, number and type of gaskets, amount and type of lubricating oil, etc.

In the step of continuously receiving a data set, at predefined time points $T_i$, for example with a predefined clock rate i.e. each time after a predefined interval, the data set is received.

The data set comprises the at least one current operational parameter of the machine, e.g. of the electric motor like the currently provided electrical power, electrical current, voltage, throttle valve position, mass flow rate, etc. giving information about the current operational state of the machine (full load, idle state, coasting, etc.). Further, the data set may comprise additional parameters that are readily available, i.e, without need of any additional sensors installed at the machine, like ambient temperature, humidity, etc.

In the step of continuously deriving a current load, at the predefined time points $T_i$, for example with the predefined clock rate i.e. each time after the predefined interval, the current load of the machine, e.g. of the electric motor or rather of each of its (critical) components is derived from the provided technical specification and the received current data set (operational parameter(s)). The current load may comprise a quantification of wear of the machine or rather of each of its (critical) components due to the current operational state and additionally or alternatively values of physical quantities present in or at the machine in the current operational state (e.g. torque, rotational speed, temperature, vibrations, etc. e.g. of an electric motor).

The current load is derived via the knowledgebase. The knowledgebase comprises relationships between the technical specification (i.e. structural information about the machine) together with the received current data set (information about the current operational state of the machine, e.g. of an electric motor) and the current load (i.e. the resulting wear) of the machine or rather its (critical) components. In other words, a (e.g. computer-implemented) knowledge base can be configured to leverage the received current data set to associate it with the provided technical specification and to derive the current load. Thereto, the knowledgebase may comprise at least one element of the group including: algorithms (e.g. scientific models), empiric values (e.g. look up tables) and expert knowledge (e.g. empiric models). With the provided technical specification and the received current data set the current load (wear) of the machine may be derived via the algorithms and additionally or alternatively via the empiric values and additionally or alternatively via the expert knowledge.

In the step of continuously determining a current condition, at the predefined time points $T_i$, for example with the predefined clock rate i.e. each time after the predefined interval, the current condition of the machine, e.g. of the electric motor or rather of each of its (critical) components is predicted by integrating over the derived current load and all previously derived current loads. In other words, the current condition is determined by continuously summing up all the derived current loads of the machine, each multiplied by the predefined interval between two time points $T_i$, $T_{i+1}$, i.e. summarised wear of the machine or rather of each of its (critical) components.

Based on deriving the condition of machines, e.g. of the electric motors according to the present invention, the condition of the machine and in particular of critical components thereof (e.g. bearings, oil, . . . ) can be determined much more precisely. This allows preventive maintenance work as well as the associated resource and personnel requirements to be planned optimally. In turn, optimized preventive maintenance leads to higher availability of the system (avoidance of downtime) or conservation of resources (component replacement only when actually necessary). This increases the productivity of the machine and thus, of entire plants.

Further, the implementation of the present invention can be carried out in three different ways (see further below), firstly, integration in a cloud system, secondly, integration in a controller like an industrial edge device or a PLC, and, thirdly, integration in the frequency converter of the electric (geared) motor. Due to the different possibilities, operators have maximum flexibility and can choose the integration variant that ideally fits the respective application or system.

Unlike Condition Monitoring Systems (CMS), which are based on external sensors, the present invention does not require expensive and error-prone external sensors. Since external sensors are often susceptible to faults and, thus, represent potential sources of error in the system, the present invention significantly increases the robustness of the respective industrial system/plant. In addition, the investment, the installation and commissioning efforts as well as the integration into the automation is significantly reduced due to the fact that external sensors are not required.

According to a refinement of the present invention, the computer-implemented method further comprises the following step:

Deriving a time point for servicing of the machine, e.g. of the electric motor based on the predicted current condition of the machine.

The time point $T_s$ for servicing may be derived or rather updated either continuously at the predefined time points $T_i$, for example with the predefined dock rate i.e. each time after the predefined interval, at other predefined time points, for example with another clock rate (e.g. once a week), or at predefined events (e.g. upon request by a user, etc.).

The predicted current condition of the machine, e.g. of the electric motor or rather of each of its (critical) components may be compared to a predefined service condition of the machine or rather of each of its (critical) components giving the condition of the machine/components at which the machine/components need servicing or replacement. Based on the difference between the predicted current condition and the predefined service condition the time point $T_s$ for servicing may be projected based on a mean load of the machine which may be determined from the current and all previous derived loads of the machine.

By deriving/updating the time point $T_s$ for servicing based on the predicted current condition of the machine, e.g. of the electric motor, the optimal time point for servicing or replacing components can be determined. Thus, unnecessary consumption of resources due to too early maintenance/replacement and failure of the machine due to too late maintenance/replacement can be effectively avoided.

According to a refinement of the present invention the machine is an electric motor, preferably a geared electric motor. The data set is received from a frequency converter of the machine.

The electric (geared) motor comprises critical components, for example, bearings, lubricating oil, holding brakes, gaskets (shaft sealing rings), etc. that need servicing or replacement, when the predefined service condition is reached.

The frequency converter of the electric (geared) motor provides the data set for deriving the current load of the electric (geared) motor. The data set, in particular, includes a current electrical power or electrical current or voltage supplied to an electric machine of the electric (geared) motor by the frequency converter. From the electrical current/voltage the current load, in particular, the current electrical power, torque, or rotational speed can be derived for example by a motor control unit like the frequency converter of the electric (geared) motor. Based on the derived current electrical power, torque, or rotational speed the current load of the electric (geared) motor is derived via the knowledgebase.

According to a refinement of the present invention the knowledge base is implemented in a cloud system. The cloud system is communicatively connected with a controller or a connector, which controller or connector is communicatively connected with the machine, in particular, the frequency converter of the electric (geared) motor. Alternatively, the cloud system is communicatively connected with the machine, in particular, the frequency converter of the electric (geared) motor.

According to a further refinement of the present invention the data processing system is a cloud system. The cloud system is communicatively connected with a controller or a connector, which controller or connector is communicatively connected with the machine, in particular, a frequency converter of the machine being an electric (geared) motor. The cloud system is communicatively connected with the machine, in particular, a frequency converter of the machine being an electric (geared) motor. The cloud system is configured to execute the method according to the first aspect of the present invention.

The cloud system may be communicatively connected to a plurality of controllers and predict the current condition and servicing time point $T_s$ for a plurality of machines (electric (geared) motors) controlled (via their respective frequency converters) by the plurality of controllers.

The controller may be a PLC or an industrial edge device connected with at least one PLC. The controller receives the current data set from the machine or rather the frequency converter of the electric (geared) motor and provides it to the cloud system for deriving the current load of the machine/electric (geared) motor.

The connector may be an internet of things (IoT) gateway communicatively connecting several machines (e.g. frequency converters of electric (geared) motors) with the cloud system. The connector receives the current data set from the machine or rather the frequency converter of the electric (geared) motor and provides it to the cloud system for deriving the current load of the machine/electric (geared) motor.

If the machine or rather the frequency converter of the electric (geared) motor is directly connected to the cloud system, the current data set is directly forwarded to the cloud system.

The advantages of implementing the determining of the current condition and the time point for servicing of the machine based on the derived and integrated current loads at the cloud system is the external administration of the knowledgebase. This greatly reduces the effort for maintenance and service (e.g. for updates due to algorithm improvements). Further, performance limits due to limited computational capacity is avoided, because cloud systems are much more powerful than stationary computers and can be easily scaled according to the needs. Moreover, the connection of several machines to the same platform is facilitated by the cloud system, while the single machines do not have to be upgraded but need only be connected (via the respective controller) to the cloud system. Thus, for example, not only the status of individual electric (geared) motors can be analysed and tracked, but also the results of the connected drive systems can be compared with each other. Consequently, on the one hand, product costs can be reduced (no upgrade of each machine), and, on the other hand, brown-field systems can also be easily expanded with the condition prediction functionality. Further, conclusions may be drawn about the operation and, if necessary, further optimization of the overall system can be achieved ("Why do the bearings of electric geared motor A wear faster than those of electric geared motor B, even though the applications are very similar?").

According to a refinement of the present invention the knowledge base is implemented in the controller, which is communicatively connected with the machine, in particular, the frequency converter of the electric motor.

According to a further refinement of the present invention is the controller, which is communicatively connected with the machine, in particular, the frequency converter of the electric motor, configured to execute the method according to the first aspect of the present invention.

The controller may be communicatively connected to a plurality of machines and predict the current condition and servicing time point $T_s$ for the plurality of machines (electric (geared) motors) controlled (via their respective frequency converters) by the controller.

The controller may be a PLC or an industrial edge device connected with at least one PLC. The controller receives the current data set from the machine or rather the frequency converter of the electric (geared) motor and derives therefrom the current load of the machine/electric (geared) motor.

One advantage of implementing the prediction of the current condition and the time point for servicing of the machine from the derived and integrated current loads at the controller is the central administration of the knowledgebase. This greatly reduces the effort for maintenance and service (e.g. for updates due to algorithm improvements). Further, performance limits due to limited computational capacity is avoided, because controllers are much more powerful than integrated computers of machines. Moreover, the connection of several machines to the same platform is facilitated by the controller, while the single machines do not have to be upgraded but need only be connected to the controller. Thus, for example, not only the status of individual electric geared motors can be analysed and tracked, but also the results of the connected drive systems can be compared with each other. Consequently, on the one hand, product costs can be reduced (no upgrade of each machine), and, on the other hand, brown-field systems can also be easily expanded with the condition prediction functionality. Further, conclusions may be drawn about the operation and, if necessary, further optimization of the overall system can be achieved ("Why do the bearings of electric geared motor A wear faster than those of electric geared motor B, even though the applications are very similar?").

According to a refinement of the present invention the knowledge base is implemented in the machine, in particular, frequency converter of the electric motor.

According to a refinement of the present invention the data processing system is the machine, in particular, the frequency converter of the electric motor configured to execute the method according to the first aspect of the present invention.

The prediction of the current condition and the time point for servicing $T_s$ of the machine is implemented directly in the machine, e.g. a computer of the machine, like a processing device of the frequency converter of the electric (geared) motor.

The implementation directly in the machine enables particularly easy prediction of the current condition and time point for servicing of the machine. Further, electric (geared) motors can be easily upgraded or retrofitted with the frequency converter including the monitoring functionality according to the present invention in order to optimize maintenance intervals and lifetime of the existing electric (geared) motors.

According to a refinement of the present invention, in the step of continuously predicting a current condition, current conditions of at least two different components of the machine are predicted. Optionally, in the step of deriving a time point for servicing, time points for servicing of the at least two different components of the machine are derived each based on the respective predicted current condition of the respective component.

The machine, in particular, the electric (geared) motor, may comprise several critical components which need timely servicing or replacement in order to avoid failure and, thus, prolonged downtime of the machine. Such critical components may be bearings of an electric machine of the electric (geared) motor, the gearbox of the electric geared motor, the bearings of the gears of the gearbox, the bearings of a drive shaft of the electric (geared) motor, lubricating oil, holding brakes, gaskets (shaft sealing rings), etc.

By predicting the current conditions and time points for servicing $T^x_s$ for some or all of the (critical) components of the machine, the optimal time point for servicing or replacing said components is determined and, thus, unnecessary consumption of resources due to too early maintenance/replacement and failure of the machine due to too late maintenance/replacement can be most effectively avoided.

BRIEF DESCRIPTION OF THE DRAWING

The present invention and its technical field are subsequently explained in further detail by exemplary embodiments shown in the drawings. The exemplary embodiments only conduce better understanding of the present invention and in no case are to be construed as limiting for the scope of the present invention. Particularly, it is possible to extract aspects of the subject-matter described in the figures and to combine it with other components and findings of the present description or figures, if not explicitly described differently. Equal reference signs refer to the same objects, such that explanations from other figures may be supplementarily used.

DETAILED DESCRIPTION OF PREFERRED EMBODIMENTS

Figure 1:
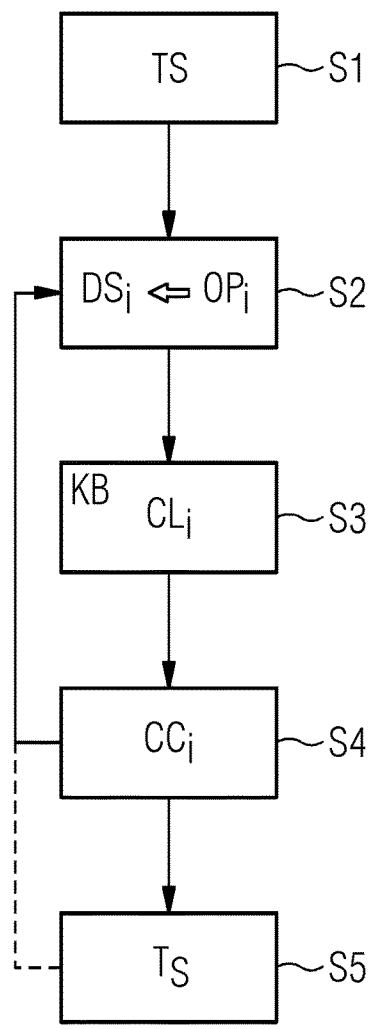
FIG. 1 shows a schematic flow-chart of an embodiment of the computer-implemented method of predicting conditions of machines and of the corresponding computer program.

In FIG. 1 a possible embodiment of the computer-implemented method of predicting conditions of machines according to the first aspect of the present invention and of the corresponding computer program according to the third aspect of the present invention are schematically depicted.

The computer-implemented method comprises the steps of receiving S1 a technical specification TS, continuously receiving S2 a data set $DS_i$, continuously deriving S3 a current load $CL_i$, continuously predicting S4 a current condition $CC_i$ and deriving S5 a time point $T_s$.

In the step of receiving S1 a technical specification TS of a machine, here exemplarily an electric geared motor 10 (see FIGS. 2 to 5) is received. The technical specification TS includes values of quantities and references describing the machine. In particular, the technical specification TS may include: a type of the motor, an installation size of the motor, a number of poles, a maximal power of the motor, a maximal torque of the motor, a maximal rotational speed of the motor, a type of the gearbox, an amount of gears, an installation size of the gearbox, a transmission ratio, a type of the drive shaft, a size/diameter of the drive shaft, a maximal load torque, a maximal load rotational speed, a maximal radial force, a drive direction (forward, backward, both), a type of the lubricating oil (for the gearbox or motor), type of oil cooling (air flow, water, none), an (average, minimal, maximal) ambient temperature, a type of bearing (for the motor or the gearbox), a type of gasket, outer mass moments of inertia, and the like.

The continuously executed steps S2 to S4 and optionally S5 are executed with a predefined clock (sampling) rate. In other words, at every equidistant time point (sampling instance) $T_i$ of the clock rate, the steps are executed.

In the step of continuously receiving S2 a data set $DS_i$, a current data set $DS_i$ is received from the machine 10, here, from a frequency converter 5 (see FIGS. 2 to 5) of the machine 10. Each current data set $DS_i$ at the time point $T_i$ includes at least one current operational parameter $OP_i$ of the machine 10. In particular, each current data set $DS_i$ may include a current electric power, a current electric current, and additionally or alternatively a current voltage supplied to drive the machine.

In the step of continuously deriving S3 a current load $CL_i$, current load $CL_i$ of critical components 1, 2, 3, 4 (see FIGS. 2 to 5) of the machine 10 is derived from the provided technical specification TS and from the received current data set ($DS_i$) via a knowledge base KB. The current load $CL_i$ comprises a quantification of wear of the machine 10 or rather of each of its critical components 1, 2, 3, 4 due to the current operational state and values of physical quantities present in or at the machine or the critical components 1, 2, 3, 4 in the current operational state (e.g. current torque, current rotational speed, current temperature, current vibrations, etc.). In particular, the current load $CL_i$ includes or rather is dependent on a current torque of the machine (motor) 10 that may be derived by the frequency converter 5 or the knowledgebase KB from the current electric current/voltage supplied to the machine 10. Further, the current load $CL_i$ may include or rather be dependent on: a current power of the motor, a current torque of the motor, a current rotational speed of the motor, a current radial force, a current drive direction (forward, backward), mass moments of inertia of components (electric machine, break, gearbox, etc.) of the machine, a mass acceleration factor, an impact level and the like which may be derived by the frequency converter 5 or the knowledgebase KB. For example, the mass acceleration factor may be calculated as:

$$m_{BF} = \frac{\text{outer mass moments of inertia}}{\text{mass moments of inertia of components}}$$

and the impact level may be determined as:

$$m_{BF} \leq 0{,}3 \rightarrow \text{impact level I}$$

$$m_{BF} \leq 3 \rightarrow \text{impact level II}$$

$$m_{BF} \leq 10 \rightarrow \text{impact level III}.$$

In the step of continuously predicting S4 a current condition $CC_i$, current conditions $CC^x_i$ of the critical components 1, 2, 3, 4 of the machine 10 are predicted. The current conditions $CC^x_i$ are predicted by integrating over the derived current load $CL_i$ and all previously derived current loads $CL_{i-1} \ldots CL_{i-N}$. The current conditions $CC^x_i$ of the critical components 1, 2, 3, 4 determined by continuously summing up all the derived current loads $CL_i \ldots CL_{i-N}$ of the machine 10, each multiplied by the predefined interval between two time points $T_i$, $T_{i+1}$ of the clock rate. In other words, the current conditions $CC^x_i$ of the critical components 1, 2, 3, 4 are the summarised wear of the critical components 1, 2, 3, 4. In particular, the "weakest link of the chain", which is important to determine the part/critical component 1, 2, 3, 4, of the machine 10 that will fail first, can thus be identified based on the respective determined current conditions $CC^x_i$ of the critical components 1, 2, 3, 4.

The step of deriving S5 a time point $T_s$ may be executed with the predefined clock rate, with another predefined dock rate (e.g. once a week), or at predefined events (e.g. upon request of a user, etc.).

In the step of deriving S5 a time point $T_s$, time points $T^x_s$ for servicing of the critical components 1, 2, 3, 4 of the machine 10 are derived each based on the respective predicted current condition $CC^x_i$ of the respective component 1, 2, 3, 4. The predicted current conditions $CC^x_i$ may be compared to predefined service conditions of the critical components 1, 2, 3, 4 of the machine 10, which predefined service conditions give the conditions of the critical components at which they need servicing or replacement. Based on the difference between the predicted current conditions $CC^x_i$ and the predefined service conditions the time points $T^x_s$ for servicing may be projected based on a mean load of the machine 10 which may be determined from the current and all previous derived current loads $CL_i \ldots CL_{i-N}$ of the machine 10.

Figure 2:
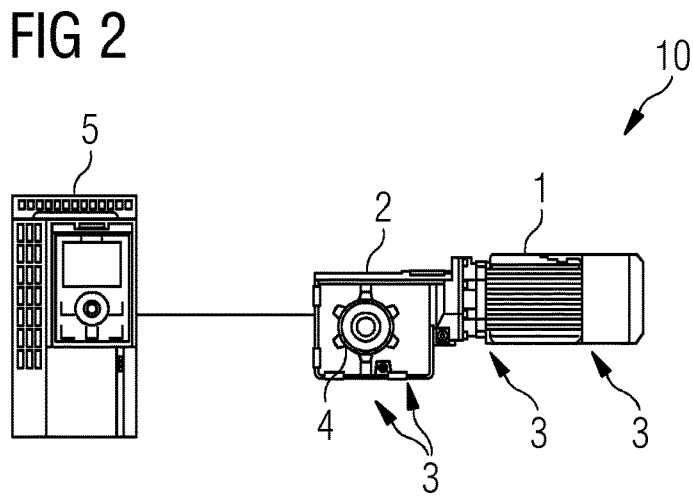
FIG. 2 shows a schematic view of an embodiment of the electric geared motor.

In FIG. 2 an embodiment of an electric geared motor 10 is schematically depicted.

The electric geared motor 10 is a possible type of machine for which the current conditions $CC^x_i$ and time points for servicing $T^x_x$ of its critical components can be predicted with the method according to FIG. 1. The electric geared motor 10 comprises the following critical components: an electric machine 1, a gearbox 2, bearings 3 and a brake 4. The electric geared motor 10 further comprises a frequency converter 5.

The electric machine 1 is electrically connected with the frequency converter 5 and driven by an electrical power supplied to the electric machine 1 by the frequency converter 5.

The gearbox 2 is mechanically connected to the electric machine 1 and transmits the torque generated by the electric machine 1 into a drive torque at a drive shaft of the electric geared motor 10.

The bearings 3 pivot the pivotable elements of the electric machine 1 and the gearbox 2 in their respective housings.

The brake 4 is mechanically connected with the electric machine 1 and additionally or alternatively with the gearbox and decelerates the pivotable elements upon actuation.

Figure 3:
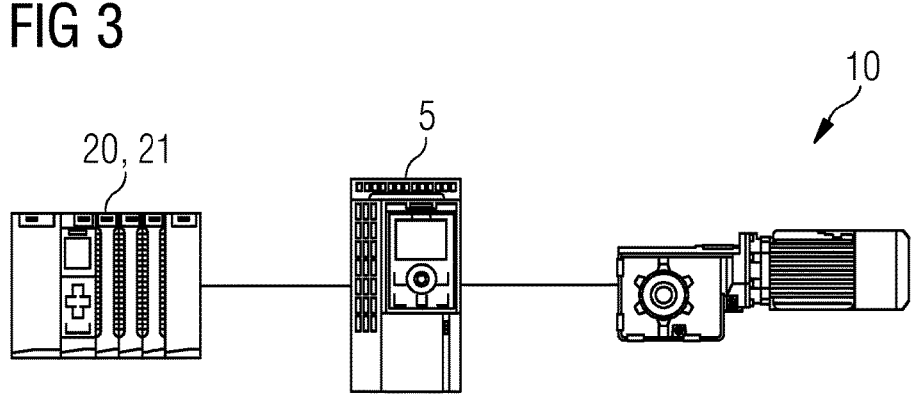
FIG. 3 shows a schematic view of an embodiment of the controller and the electric geared motor.
Figure 4:
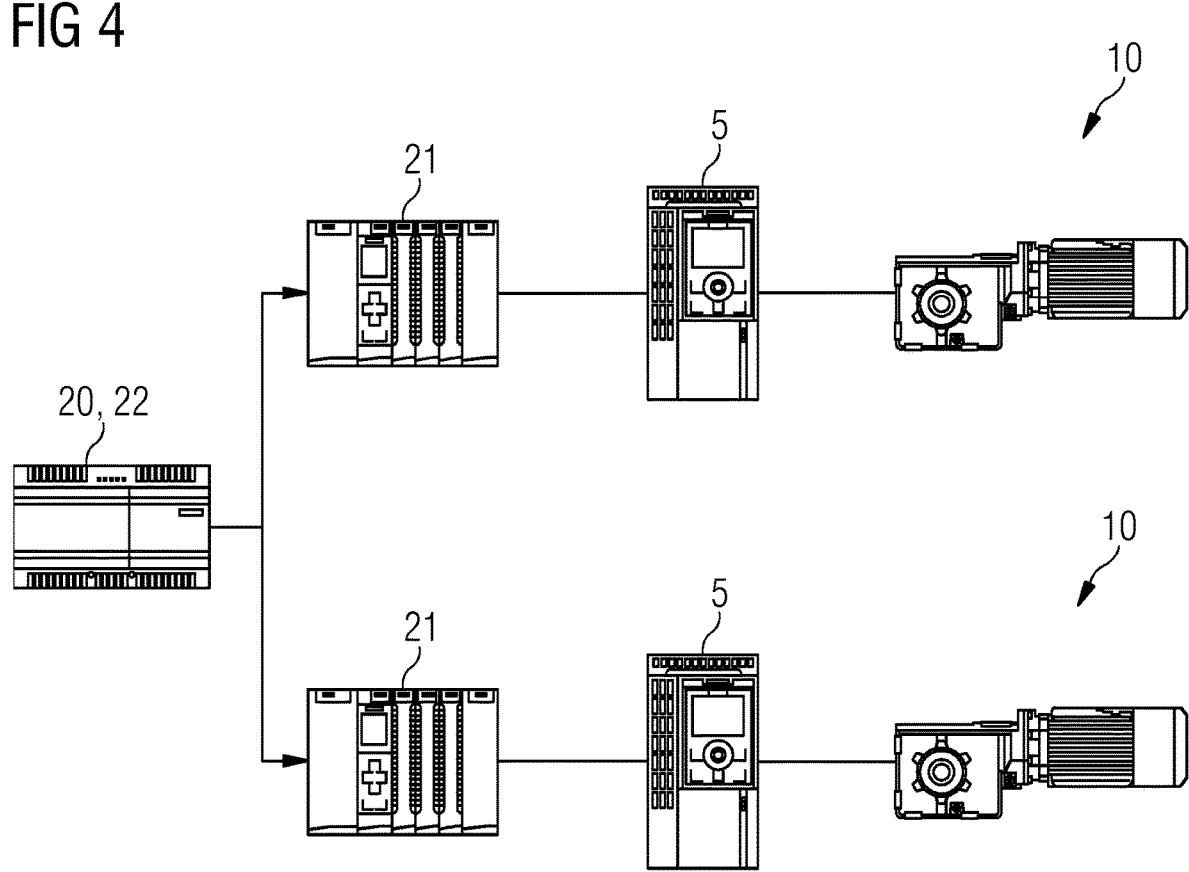
FIG. 4 shows a schematic view of another embodiment of the controller and the electric geared motor.
Figure 5:
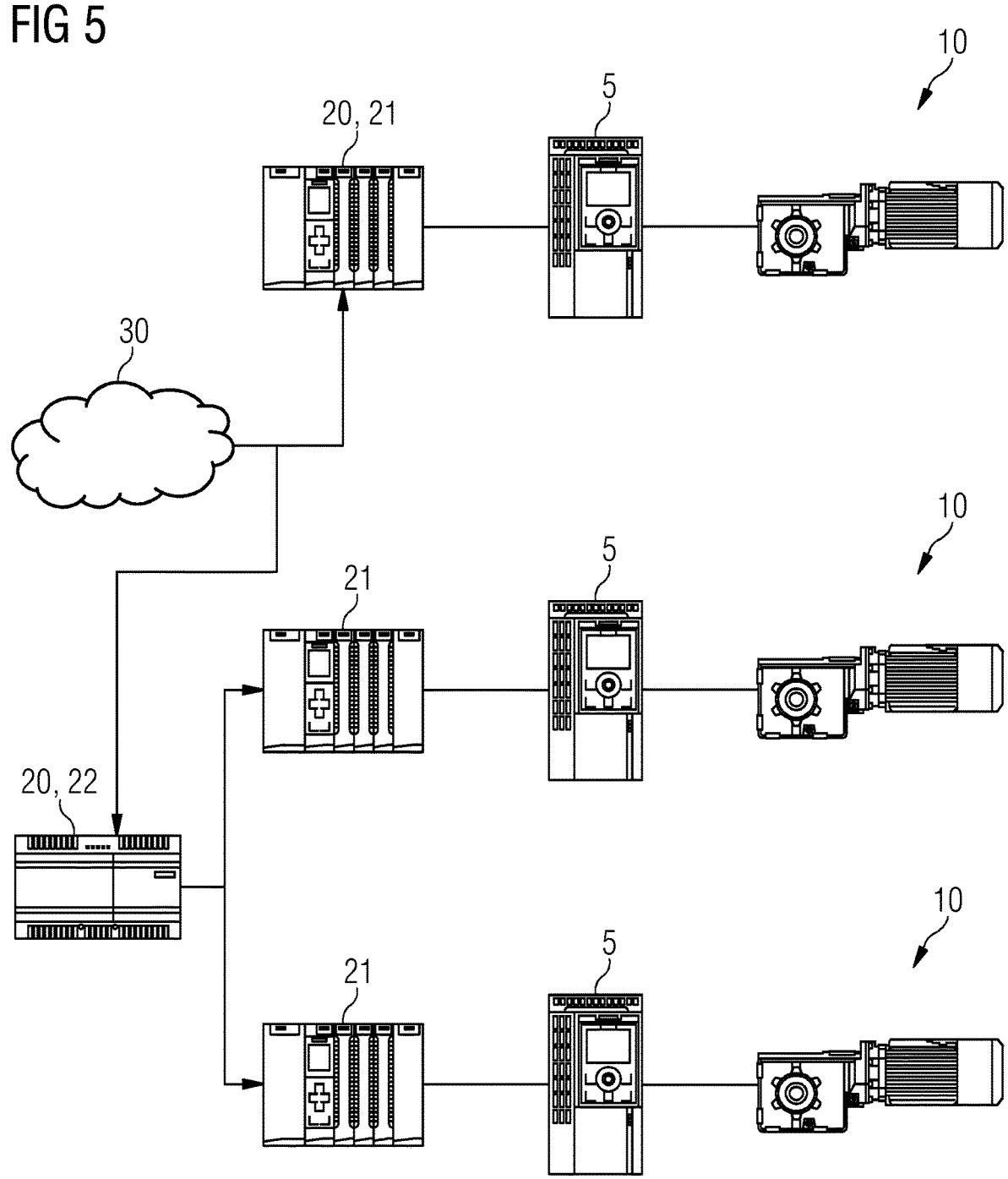
FIG. 5 shows a schematic view of an embodiment of the cloud system, controllers and electric geared motors.

The frequency converter 5 is electrically connected to an electrical power source (not depicted) and to a controller 20 (see FIGS. 3 to 5). The frequency converter 5 adapts the electrical power of the electrical power source according to control commands of the controller 20 and provides the adapted electrical power to the electric machine 1.

The frequency converter 5 comprises a data processing system 40 (see FIG. 6) like a computer and is configured to execute the method according to FIG. 1.

In FIG. 3 an embodiment of the controller 20 and the electric geared motor 10 is schematically depicted. The electric geared motor 10 corresponds to the electric geared motor according to FIG. 2, except its frequency converter 5 which is here not configured to execute the method according to FIG. 1.

The controller 20 is here a programmable logic controller PLC 21 and communicatively connected to the frequency converter 5 of the electric geared motor 10. The PLC 21 may be communicatively connected to several machines like electric geared motors 10. The PLC 21 provides control commands to the frequency converter 5 for controlling the drive torque of the electric geared motor 10 (and may further provide control commands to several other machines).

The controller 20/PLC 21 comprises a data processing system 40 (see FIG. 6) like a computer and is configured to execute the method according to FIG. 1 (for each of the machines 10 connected to the PLC 21). Thereto, the frequency converter 5 forwards the current data set DS to the PLC 21 at every sampling instance of the predefined clock rate.

In FIG. 4 another embodiment of the controller 20 and the electric geared motor 10 is schematically depicted. The electric geared motor 10 corresponds to the electric geared motor according to FIG. 3 and the PLCs 21 correspond to the PLC 21 according to FIG. 3, except here they are not configured to execute the method according to FIG. 1.

The controller 20 is here an industrial edge device 22 and communicatively connected to several, here exemplarily two, PLCs 21 which are each communicatively connected with exemplarily one electric geared motor 10. The industrial edge device 22 provides control commands to the PLCs 21 for controlling the drive torques of the electric geared motors 10 (and several other (not depicted) machines connected to the PLCs 21).

The controller 20/industrial edge device 22 comprises a data processing system 40 (see FIG. 6) like a computer and is configured to execute the method according to FIG. 1 for each of the electric geared motors 10 (and for the several other machines connected to the PLCs 21). Thereto, the frequency converters 5 forward the current data sets DS to the PLCs 21 which in turn forwards the current data sets $DS_i$ to the industrial edge device 22 at every sampling instance of the predefined clock rate.

In FIG. 5 an embodiment of the cloud system 30, controllers 20 and electric geared motors 10 is schematically depicted. The electric geared motor 10 corresponds to the electric geared motor according to FIGS. 3 and 4, the PLCs 21 correspond to the PLCs 21 according to FIGS. 3 and 4, except here they are not configured to execute the method according to FIG. 1, and the industrial edge device 22 corresponds to the industrial edge device 22 according to FIG. 4, except here it is not configured to execute the method according to FIG. 1.

The cloud system 30 is communicatively connected to the industrial edge device 22, which is connected to two of the PLCs 21, and to one of the PLCs 21, which is not connected to the industrial edge device 22. The PLCs 21 are each communicatively connected with exemplarily one electric geared motor 10 (and several other (not depicted) machines). The cloud system 30 may also be communicatively connected to a connector, in particular an IoT gateway (not depicted), which connector is communicatively connected to one or more machines 10 or rather frequency converters 5 of electric (geared) motors 10. Moreover, the cloud system 30 may be directly communicatively connected to one or more machines 10 or rather frequency converters 5 of electric (geared) motors 10 (not depicted).

The cloud device 30 comprises a data processing system 40 (see FIG. 6) like a computer and is configured to execute the method according to FIG. 1 for each of the electric geared motors 10 (and for the several other machines connected to the PLCs 21). Thereto, the frequency converters 5 forward the current data sets $DS_i$ either directly to the cloud system 30 (not depicted) or to the PLCs 21 and connector (not depicted). The PLCs 21 forward the current data sets DS to the industrial edge device 22, if connected thereto. The PLC 21 not connected to the industrial edge device 22, the connector (not depicted), and the industrial edge device 22 forward the current data sets $DS_i$ to the cloud system 30 at every sampling instance of the predefined clock rate.

Figure 6:
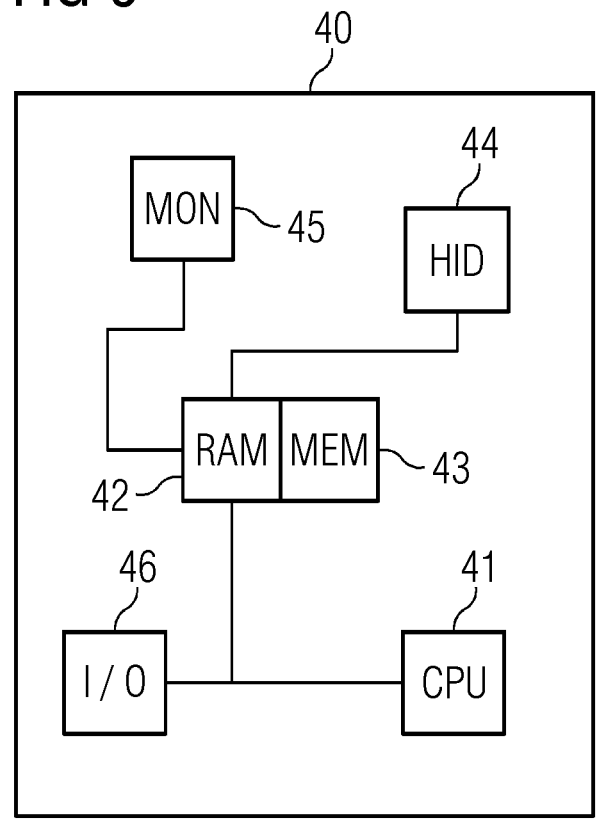
FIG. 6 shows a schematic view of an embodiment the data processing system for predicting conditions of machines.

In FIG. 6 an embodiment of the data processing system 40 for predicting conditions of machines according to the second aspect of the present invention is schematically depicted.

The data processing system 40 may be a personal computer (PC), a laptop, a tablet, a server, a distributed system (e.g. cloud system) and the like. The data processing system 40 comprises a central processing unit (CPU) 41 a memory having a random-access memory (RAM) 42 and a non-volatile memory (MEM, e.g. hard disk) 43, a human interface device (HID, e.g. keyboard, mouse, touchscreen etc.) 44, an output device (MON, e.g. monitor, printer, speaker, etc.) 45 and an interlace (I/O) 46 for receiving and sending data. The CPU 41, RAM 42, HID 44 MON 45 and I/O 46 are communicatively connected via a data bus. The RAM 42 and MEM 43 are communicatively connected via another data bus.

Figure 7:
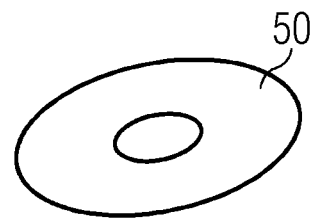
FIG. 7 shows a schematic view of an embodiment of the computer-readable medium.

The computer program according to the third aspect of the present invention and schematically depicted in FIG. 1 can be loaded into the RAM 42 from the MEM 43 or another computer-readable medium 50 (see FIG. 7). According to the computer program the CPU executes the steps S1 to S5 of the computer-implemented method according to the first aspect the present invention and schematically depicted in FIG. 1. The execution can be initiated and controlled by a user via the HID 44. The status and/or result of the executed computer program may be indicated to the user by the MON 45 or output via the I/O 46, The result of the executed computer program may be permanently stored on the non-volatile MEM 43 or another computer-readable medium.

In particular, the CPU 41 and RAM 42 for executing the computer program may comprise several CPUs 41 and several RAMs 42 for example in a computation cluster or a cloud system 30 (see FIG. 5). The HID 34 and MON 35 for controlling execution of the computer program may be comprised by a different data processing system like a terminal communicatively connected to the data processing system 40 (e.g. cloud system 30).

In FIG. 7 an embodiment of the computer-readable medium 50 according to the fourth aspect of the present invention is schematically depicted.

Here, exemplarily a computer-readable storage disc 50 like a Compact Disc (CD), Digital Video Disc (DVD), High Definition DVD (HD DVD) or Blu-ray Disc (BD) has stored thereon the computer program according to the third aspect of the present invention and as schematically shown in FIG. 1. However, the computer-readable medium may also be a data storage like a magnetic storage/memory (e.g. magnetic-core memory, magnetic tape, magnetic card, magnet strip, magnet bubble storage, drum storage, hard disc drive, floppy disc or removable storage), an optical storage/memory (e.g. holographic memory, optical tape, Tesa tape, Laserdisc, Phasewriter (Phasewriter Dual, PD) or Ultra Density Optical (UDO)), a magneto-optical storage/memory (e.g. MiniDisc or Magneto-Optical Disk (MO-Disk)), a volatile semiconductor/solid state memory (e.g. Random Access Memory (RAM), Dynamic RAM (DRAM) or Static RAM (SRAM)) or a non-volatile semiconductor/solid state memory (e.g. Read Only Memory (ROM), Programmable ROM (PROM), Erasable PROM (EPROM), Electrically EPROM (EEPROM), Flash-EEPROM (e.g. USB-Stick), Ferroelectric RAM (FRAM), Magnetoresistive RAM (MRAM) or Phase-change RAM).

Figure 8:
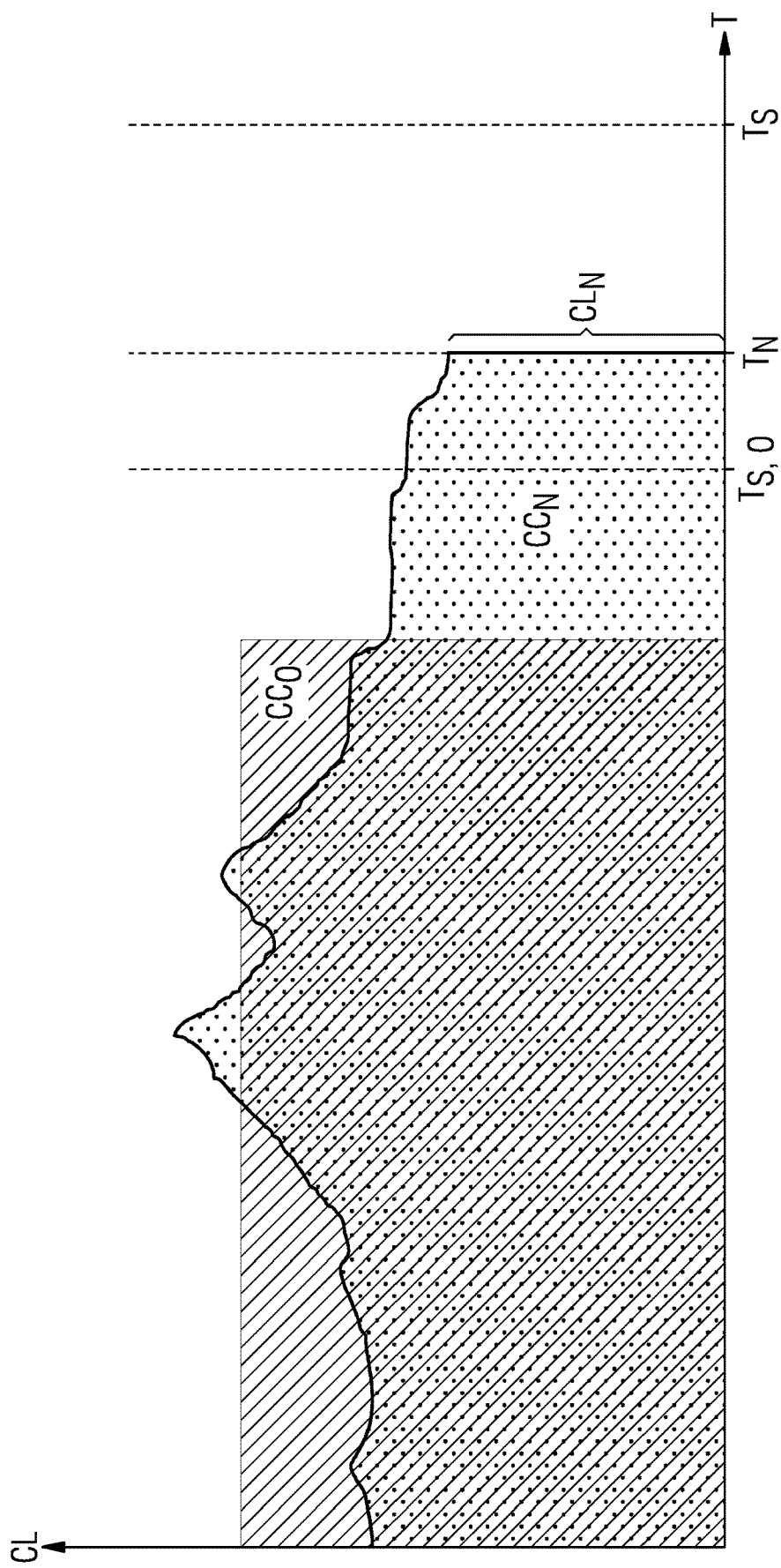
FIG. 8 shows an exemplary graph of a statically calculated current condition and time point for servicing and a dynamically calculated current condition and time point for servicing of the machine.

In FIG. 8 an exemplary graph of a statically calculated current condition $CC_0$ (hatched area) and time point $T_{S,0}$ for servicing and a dynamically calculated current condition $CC_N$ and time point $T_s$ for servicing of the machine 10 (see FIGS. 2 to 5) is schematically depicted.

The current condition $CC_0$ (hatched area) and time point $T_{S,0}$ for servicing are statically calculated based on the technical specification TS and one static data set that includes static information about a static operational state of the machine 10.

In real operation, however, the current load $CL_i$ of the machine 10 varies depending on multiple factors (e.g. level of current utilisation, idle times, etc.). For example, the current load $CL_N$ at time point $T_N$ is lower than the assumed load.

Consequently, the real wear and the resulting real current condition of the machine 10 differ significantly from the statically calculated values. In particular, the statically calculated time point $T_{S,0}$ for servicing is here much earlier than the time point $T_S$ for servicing predicted according to the present invention. Consequently, premature servicing of the machine 10 and accompanying unnecessary consumption of resources can be avoided. Also in the other case, where the real current load $CL_i$ i.e. wear is often higher than statically calculated, too late servicing and possible failure of the machine can be reliably avoided.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects. In the context of the present description and claims the conjunction "or" is to be understood as including ("and/or") and not exclusive ("either . . . or").

The invention claimed is:

1. A computer-implemented method for determining conditions of electric motors, the method comprising:
   receiving a technical specification of an electric motor comprising at least maximal torque and/or maximal rotational speed of an electric motor;
   supplying the electric motor with an electric power by a frequency converter of the electric motor thereby operating the electric motor;
   continuously receiving from the frequency converter of the electric motor during operation of the electric motor, a data set including at least electrical current currently supplied to the electric motor by the frequency converter;
   continuously deriving a current load of the electric motor during operation of the electric motor based on the technical specification and the data set via a knowledge base, wherein the knowledge base comprises relationships between the technical specification together with the data set and the current load of the electric motor, wherein deriving the current load comprises deriving a current electrical torque of the electrical motor by the frequency converter, and based on the derived current electrical torque, deriving the current load of the electric motor via the knowledge base;
   continuously during operation of the electric motor determining a current condition of the electric motor by integrating over the derived current load and all previously derived current loads;
   deriving and updating a time point for servicing of the electric motor based on the current condition of the electric motor; and
   indicating the time point for servicing of the electric motor.

2. The computer-implemented method of claim 1, wherein the electric motor is a geared electric motor.

3. The computer-implemented method of claim 1, wherein the knowledge base is implemented in a cloud system, and the cloud system is communicatively connected with a controller or connector, the controller or connector communicatively connected with the electric motor, or alternatively, the cloud system is communicatively connected with the electric motor.

4. The computer-implemented method of claim 3, wherein the controller or connector is communicatively connected with the frequency converter of the electric motor.

5. The computer-implemented method of claim 3, wherein the cloud system is communicatively connected with the frequency converter of the electric motor.

6. The computer-implemented method of claim 1, wherein the knowledge base is implemented in a controller communicatively connected with the electric motor.

7. The computer-implemented method of claim 6, wherein the controller is communicatively connected with the frequency converter of the electric motor.

8. The computer-implemented method of claim 1, wherein the knowledge base is implemented in the frequency converter of the electric motor.

9. The computer-implemented method of claim 4, wherein continuously deriving the current load of the electric motor comprises deriving a current load of at least two different components of the electric motor, and wherein continuously determining a current condition comprises predicting current conditions of the at least two different components of the electric motor.

10. The computer-implemented method of claim 9, wherein deriving a time point for servicing comprises deriving time points for servicing of the at least two different components of the electric motor each based on the respective predicted current condition of the respective component.

11. A data processing system for predicting conditions of electric motors, the data processing system comprising means for carrying out a computer-implemented method as set forth in claim 1.

12. The data processing system of claim 11, wherein the knowledge base is implemented in a cloud system, and the cloud system is communicatively connected with a controller or connector, the controller or connector communicatively connected with the electric motor, or alternatively, the cloud system is communicatively connected with the electric motor.

13. The data processing system of claim 12, wherein the controller or connector is communicatively connected with the frequency converter of the electric motor.

14. The data processing system of claim 12, wherein the cloud system is communicatively connected with the frequency converter of the electric motor.

15. The data processing system of claim 13, wherein the knowledge base is implemented in a controller communicatively connected with the electric motor.

16. The data processing system of claim 15, wherein the controller is communicatively connected with the frequency converter of the electric motor.

17. The data processing system of claim 11, wherein the knowledge base is implemented in the frequency converter of the electric motor.

18. A computer program embodied in a non-transitory computer readable medium comprising instructions which, when the computer program is executed by a computer, cause the computer to carry out the steps of the method of claim 1.

19. A computer-readable non-transitory storage medium having stored thereon a computer program to operate the data processing system of claim 17.

* * * * *